United States Patent [19]

Schmale

[11] Patent Number: 4,804,226
[45] Date of Patent: Feb. 14, 1989

[54] DEFORMATION-RESISTANT FRAME FOR SEATS OF MOTOR VEHICLES

[75] Inventor: Gerhard Schmale, Hückeswagen, Fed. Rep. of Germany

[73] Assignee: Keiper Recaro GmbH. & Co., Remscheid, Fed. Rep. of Germany

[21] Appl. No.: 74,919

[22] Filed: Jul. 17, 1987

[30] Foreign Application Priority Data

Jul. 18, 1986 [DE] Fed. Rep. of Germany ....... 3624295

[51] Int. Cl.⁴ ............................................ B60R 21/00
[52] U.S. Cl. .................................... 297/216; 297/483
[58] Field of Search ................................ 297/216, 483

[56] References Cited

U.S. PATENT DOCUMENTS

| 4,040,660 | 8/1977 | Barecki | 297/216 |
| 4,076,306 | 2/1978 | Satzinger | 297/216 |
| 4,192,545 | 3/1980 | Higochi et al. | 297/216 |
| 4,431,233 | 2/1984 | Ernst | 297/483 |
| 4,544,204 | 10/1985 | Schmale | 297/216 X |

Primary Examiner—James T. McCall
Attorney, Agent, or Firm—Peter K. Kontler

[57] ABSTRACT

The frame of the seat in a motor vehicle has a base for the cushion which carries the weight of the occupant and a back rest which carries the cushion for the back of the occupant. The back rest has two upwardly extending parallel frame members and a connector between the upper ends of the frame members. The upper end of one frame member carries a takeup reel for the safety belt whose latch plate can be inserted into a buckle adjacent the lower end of the other frame member. When the belt is applied and is tensioned, such as in the event of an accident, it applies to the one frame member a force acting diagonally of the back rest and tending to bend the one frame member forwardly and toward the other side of the seat. The cross-sectional outline of the one frame member and the orientation of such cross-sectional outline are selected in such a way that the one frame member offers maximum resistance to deformation by the belt in the direction in which the belt acts thereon in the event of an accident. This renders it possible to reduce the wall thickness of the one frame member and to make such frame member of simple C-shaped, U-shaped or Z-shaped profiled stock.

15 Claims, 1 Drawing Sheet

DEFORMATION-RESISTANT FRAME FOR SEATS OF MOTOR VEHICLES

BACKGROUND OF THE INVENTION

The invention relates to seats in general, and more particularly to improvements in seats which can be used with advantage in motor vehicles. Still more particularly, the invention relates to improvements in seats of the type wherein the occupant can be protected by a safety belt or seat belt to stand a better chance of surviving, remaining uninjured or suffering less serious injuries in the event of an accident.

It is known to connect one coupling element for the safety belt at the upper end of one lateral frame member for the back rest cushion of a seat in a motor vehicle. The belt extends from such coupling element to another coupling element which is located at the level of the base of the seat opposite the lateral frame member which carries the one coupling element. The other coupling element can constitute a buckle which can receive a latch plate at the free end of the belt. As a rule, the frame member which carries the one coupling element (such as a reel which is designed to automatically collect the belt as soon as the latch plate is disengaged from the buckle) is a hollow profile which is assembled of two C-shaped or U-shaped shells in order to be capable of standing pronounced stresses which develop when the belt is under tension during a collision or as a result of forward propulsion of the body of the occupant during abrupt deceleration or stoppage of the vehicle. The upper end portions of the lateral frame members of the back rest of the seat frame are normally connected to each other by a crossbar which also exhibits a hollow profile, normally a polygonal profile, and is assembled of several metallic shells having a C-shaped or U-shaped cross-sectional outline.

Such back rests are capable of standing pronounced deforming and breaking stresses, provided that their profiles are dimensioned accordingly, i.e., that their wall thickness is sufficient to enable the lateral frame member which carries the one coupling element to retain its shape in the event of a collision or under analogous adverse circumstances. This contributes to the cost and weight of the seat, and more particularly to the bulk, weight and cost of the frame portion which is to carry the cushion for the back of the occupant of the seat.

OBJECTS AND SUMMARY OF THE INVENTION

An object of the invention is to provide a seat whose frame can stand pronounced stresses which are applied thereto by a safety belt even though the frame can be of lightweight construction.

Another object of the invention is to provide a seat frame wherein the part or parts which are connected to the safety belt need not have a closed profile and wherein the weight, bulk and cost of such parts is or can be a fraction of the weight, bulk and cost of conventional parts without reducing their ability to stand pronounced stresses in the event of an accident or under similar circumstances.

A further object of the invention is to provide a novel and improved back rest frame for use in the seat of a motor vehicle.

An additional object of the invention is to provide a back rest frame wherein the lateral frame members are oriented and configured in a novel and improved way so as to allow for a reduction of their weight and bulk but without affecting their ability to stand deforming and breaking stresses.

A further object of the invention is to provide a back rest frame which can be combined with the base frames of conventional seats to reduce the weight of the seat while enhancing the safety of the occupant.

Still another object of the invention is to provide a novel and improved method of orienting various component parts of the seat frame for use in motor vehicles.

The invention is embodied in a seat for use with a safety belt or seat belt, particularly in motor vehicles. The seat includes a frame having a base and a back rest, and the back rest includes two spaced-apart lateral frame members having first (lower) portions adjacent the base and second (upper) portions which are remote from the base. The back rest of the frame further includes a connector (e.g., a crossbeam) between the frame members (such connector preferably extends between the second portions of the frame members). The seat further includes or is associated with means for coupling the belt to the frame, and such coupling means includes a first coupling element (e.g., including a takeup reel for the belt) which is provided on one of the lateral frame members and is spaced apart from the base (such coupling element can be mounted on or close to the second or upper portion of the one frame member), and a second coupling element (e.g., a buckle) which is disposed in the region of the base and is remote from the first portion of the one frame member (the second coupling element can be disposed in the region of the first or lower portion of the other frame member) so that, when the safety belt is in use and extends between the two coupling elements, it applies to the one frame member a deforming force acting in a predetermined direction (normally substantially diagonally of the back rest). The cross-sectional outline and the orientation of such cross-sectional outline of the one frame member are such that the resistance of the one frame member to the aforementioned deforming force exceeds the resistance to such deforming force (i.e., to a force of the same or similar magnitude) in the majority of or in all directions other than the predetermined direction.

The other frame member can be substantially mirror symmetrical to the one frame member with reference to a vertical plane which is located midway between the two frame members. This simplifies the making of the frame (especially of the back rest) and renders it possible to use one and the same frame in the driver's seat or in any other seat in a motor vehicle.

The one frame member can have an open profile (e.g., a C-shaped, Z-shaped or U-shaped profile) with a web and two legs flanking the web. The web can be located in or close to a plane which is parallel to the aforementioned predetermined direction.

Alternatively, the one frame member can have a substantially L-shaped or a similar profile. The axis of maximum resistance of such one frame member to deformation by the deforming force of the tensioned belt is then disposed in a plane which is inclined with reference to a plane halving the seat and extending between the two frame members (provided that one leg of the one frame member extends transversely of an the other leg is parallel to the longitudinal direction of the seat (i.e., to the direction of forward movement of the vehicle along a straight path).

The connector can include a narrower median or central portion and two wider end portions which are connected to (and can be integral with) the second portions of the frame members. This enhances the rigidity of the back rest. The connector can be provided with at least one edge face which faces toward the base and can have a concave outline or can be composed of two or more straight sections (e.g., in the form of an inverted V).

The base can include a first portion which is adjacent the first portion of the one frame member, and a second portion which is adjacent the first portion of the other frame member. The seat including such base can further comprise a reinforcing or stiffening extension or arm which is disposed in the region of the first portion of the one frame member and projects toward the second portion of the base. The extension can engage and bear against an abutment (e.g., against the floor of a motor vehicle or against an elongated rail which is placed between the first and second portions of the base), at least when the one frame member is acted upon by the aforementioned deforming force in the event of an accident or under similar adverse circumstances. The extension is or can be spaced apart from the abutment when the one frame member is not acted upon by the deforming force.

A hinge joint is normally provided between the first portion of the one frame member and the adjacent first portion of the base, and such hinge joint has a first leaf, arm or a like component which is rigid with the one frame member and a second leaf, arm or a like component which is rigid with the first portion of the base. The aforementioned extension can be rigid or integral with one of these components, for example, with the second component.

The seat can further comprise stationary guide means (e.g., in the form of two parallel elongated rails mounted on the floor of a motor vehicle) for the first and second portions of the base. The base is movable relative to the guide means forwardly and backwards, and the abutment is disposed between the guide means. Adjusting means can be provided to change the level of the base with reference to the guide means.

The novel features which are considered as characteristic of the invention are set forth in particular in the appended claims. The improved seat frame itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
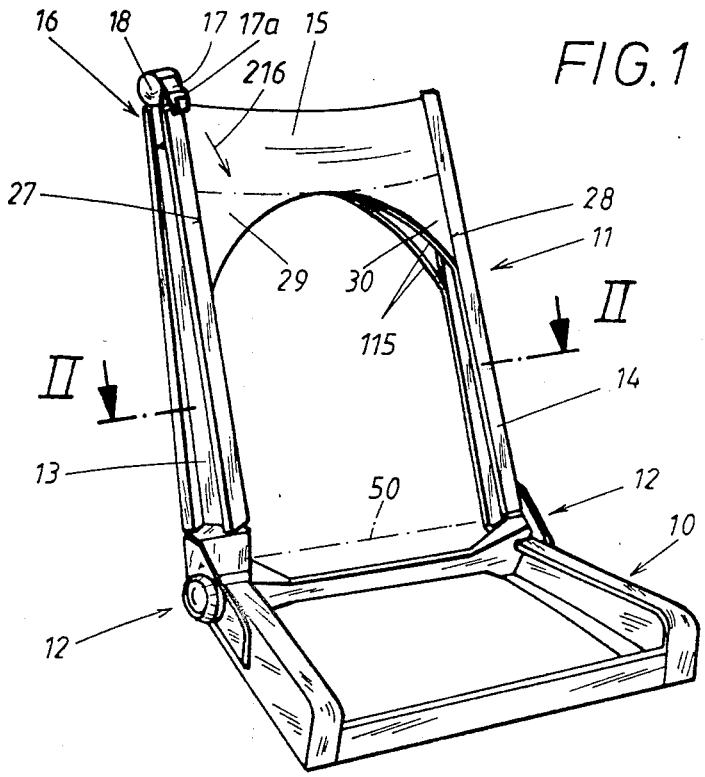
FIG. 1 is a perspective view of a seat frame which embodies one form of the invention, with one of the coupling elements for the safety belt omitted.
Figure 2:
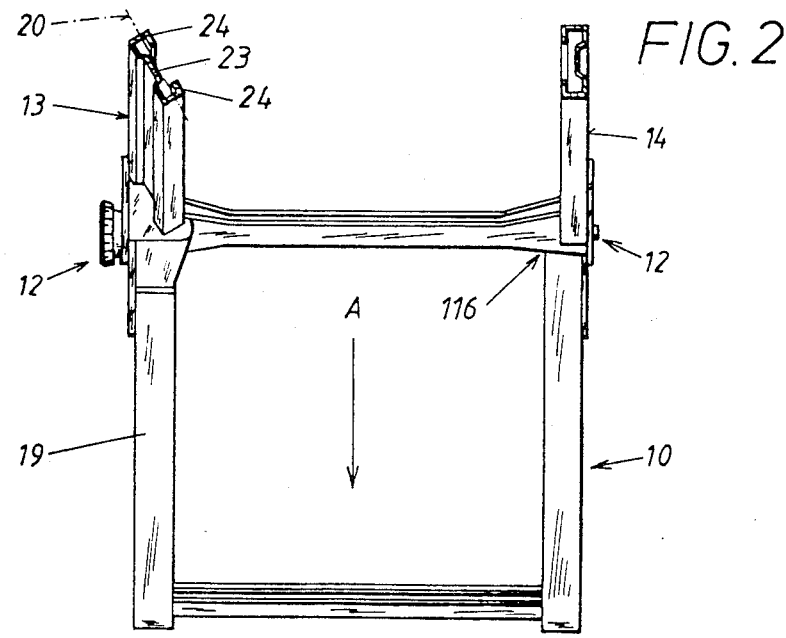
FIG. 2 is a plan view of the frame, with the back rest shown in a sectional view as seen in the direction of arrows from the line II—II of FIG. 1.

FIG. 1 shows a skeleton frame forming part of a seat for use in a motor vehicle. The frame includes a base 10 for the cushion which carries the weight of the occupant of the seat, and a back rest or seatback 11. The hinge joints 12 are provided to adjustably connect the base 10 and the back rest 11 to each other so that the back rest can be moved to any one of a number of inclined positions in a manner well known from the art of seats for motor vehicles. The frame which is shown in FIGS. 1 and 2 is part of the seat next to the driver's seat in a motor vehicle. The base 10 has two parallel portions 19 and 19a.

The back rest 11 includes two spaced-apart elongated lateral frame members 13, 14 whose lower portions are adjustably connected to the base 10 by the respective hinge joints 12, and a transversely extending crossbeam or connector 15 which extends between the upper end portions of the frame members 13, 14 to stiffen the back rest 11.

The upper end portion of the frame member 13 carries a coupling element 16 for an end portion or an intermediate portion of a seat belt or safety belt 17. The coupling element 16 can include a conventional takeup reel 18 wherein a spring tends to convolute the belt 17 so that only the latch plate 17a at the free end of the belt remains exposed and can be grasped by the occupant of the seat to be inserted into the second coupling element (such as the buckle whose location is indicated by arrow 116) in the region of the right-hand hinge joint 12 and base portion 19a of FIG. 1. The reel 18 can be mounted on a post of the vehicle frame, and the coupling element 16 then merely comprises an eyelet or an analogous guide for an intermediate portion of the belt 17.

It is clear that the coupling element 16 which is provided on the frame of the driver's seat is located at the top of the right-hand lateral frame member corresponding to the frame member 14 of FIG. 1, and the buckle is then located in the region of the left-hand hinge joint 12. In other words, the illustrated frame of the passenger seat next to the driver's seat is or can be mirror symmetrical to the frame of the driver's seat.

When the belt 17 is in actual use, it extends from the coupling element 16 to the coupling element in the region 116 of the right-hand hinge joint 12 and forms a loop having a length depending on the size of the occupant of the seat. The looped portion of the belt 17 is then located in a plane extending substantially diagonally from the coupling element 16 to the right-hand hinge joint 12. In the event of a collision or in response to abrupt maneuvering (deceleration or stoppage) of the vehicle, the belt 17 is acted upon by a force 216 which is inclined with reference to the normal direction of forward movement of the vehicle (as indicated by the arrow A in FIG. 2) and acts substantially diagonally of the back rest 11. In order to be capable of reliably withstanding such stresses, the orientation of the lateral frame member 13 with reference to the adjacent lateral frame member 19 of the base 10 is such that the axis 20 (see FIG. 2) of its cross-sectional outline is inclined with reference to the direction of arrow A in the same way, or at least substantially in the same way, as the force 216 acting upon the applied belt 17. Otherwise stated, the maximum moment of resistance of the lateral frame member 13 is selected with a view to ensure that this frame member invariably offers to deformation by the belt 17 a resistance which is the maximum resistance or at least close to maximum resistance of the frame member 13 to deformation in any direction. The frame member 13 has a substantially C-shaped (open) cross-sectional outline with the web 23 extending in parallelism with the axis 20 and with the legs 24 extending substantially at right angles to such axis. The axis of the cross-sectional outline of the right-hand frame member 14 is parallel to the longitudinal direction of the seat (arrow A).

Figure 3:
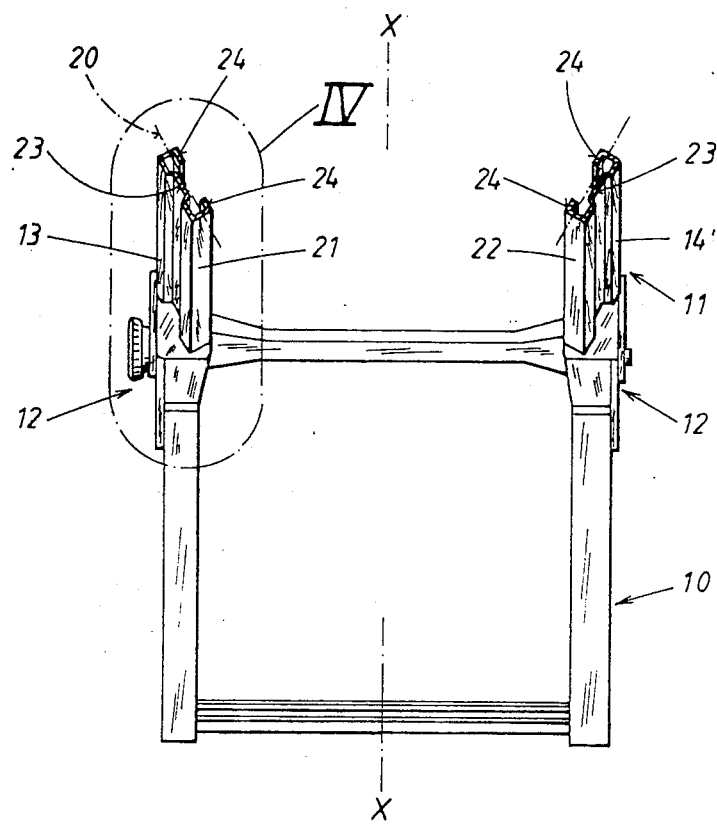
FIG. 3 is a plan view similar to that of FIG. 2 but showing a second seat frame with two mirror symmetrical frame members in the back rest.

FIG. 3 shows a portion of a modified skeleton frame which is identical with the frame of FIGS. 1–2 except that the inclination of the cross-sectional outline of the right-hand frame member 14' is the same as that of the cross-sectional outline of the left-hand frame member 13. The frame members 13 and 14' of FIG. 3 are mirror symmetrical to each other with reference to a vertical plane X-X which halves the frame and is located midway between the two hinge joints 12 as well as midway between the frame members 13 and 14'. The front surfaces 21, 22 of the front legs 24 of frame members 13, 14' are inclined with reference to the plane X-X through identical angles, the same as the webs 23 and the rear legs 24, respectively. The webs 23 are much longer than the legs 21, 22 or 24. As can be seen in FIG. 1, the cross-sectional area of each of the lateral frame members 13, 14 can increase gradually from the respective hinge joint 12 toward the respective end portion of the connector 15. This can also apply for the frame members 13, 14' of FIG. 3. In other words, the width of the webs 23 of lateral frame members 13, 14 or 13, 14' can decrease gradually upwardly so that each of these webs resembles a slender wedge.

Figure 4:
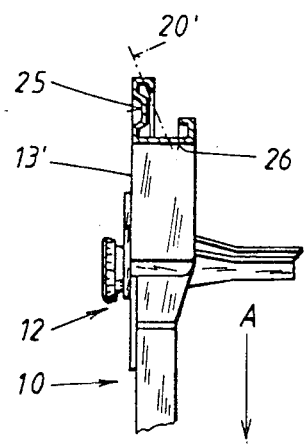
FIG. 4 shows a detail corresponding to that within the phantom line IV of FIG. 3 but with a modified lateral frame member for one coupling element of the belt.

FIG. 4 shows a slight modification of the left-hand frame member 13 of FIG. 3. The difference is that the frame member 13' of FIG. 4 has a substantially L-shaped cross-sectional outline with two substantially equal legs 25, 26 extending at right angles to each other. Therefore, the line 20' which denotes the direction of moment of maximum resistance of the frame member 13' to deformation is not parallel to the leg or web 25 but makes therewith an acute angle. The leg or web 25 is or can be parallel or nearly parallel to the longitudinal direction (arrow A) of the seat which embodies the frame member 13' of FIG. 4. The designer of the frame can select the inclination of the main axis 20' practically at will by the simple expedient of properly selecting the length of the legs 25, 26 relative to each other, e.g., by shortening or lengthening the leg 26 in a direction at right angles to that indicated by the arrow A.

In each of the heretofore described embodiments of the improved frame, the connector 15 which extends between the upper end portions of the lateral frame members preferably comprises a relatively narrow median or central portion and two wider end portions 29, 30 which are fixedly secured to adjacent portions 27, 28 (see FIG. 1) of the respective lateral frame members.

The portions 29, 30 can be integral with the end portions 27, 28 of the respective lateral frame members to even further enhance the stability of the back rest 11. The concave edge faces 115 bounding the underside of the connector 15 can have a constant curvature (i.e., they can form portions of cylinders) or they can have a hyperboloidal or paraboloidal outline. If desired, the configuration of the connector 15 can be simplified by providing its lower portion with two mutually inclined straight edge faces in the form of an inverted V.

As a rule, a vibration-insulating mat 50 (indicated in FIG. 1 by phantom lines) is installed in the back rest 11 to constitute a substrate for the cushion which contacts the garment on the back of the occupant of the seat. The distance of locations where the mat 50 is secured to the frame member 13 which carries the coupling element 16 for the belt 17 from the neutral zone of the frame member 13 is greater than the distance of locations where the mat 50 is connected to the other frame member 14 from the neutral zone of the frame member 14.

An advantage of the improved frame is that the frame member 13 can stand the anticipated stresses even if it has an open C-shaped or U-shaped profile. This is due to the aforediscussed orientation of the axis 20 of its profile with reference to the direction which is indicated by the arrow A, i.e., the axis is parallel or nearly parallel to the direction of the force which is applied to the frame member 13 by the belt 17 when the latter is under tension. It has been found that the static stability of the Z-shaped, C-shaped or U-shaped frame member 13 suffices, even when the belt 17 is subjected to very pronounced tensional stresses which tend to move the frame member 13 with reference to the connector 15 and other components of the back rest 11 and/or base 10. At the same time, the frame member 13 is still free to perform certain movements relative to the other component parts, such as a certain amount of twisting which may be desirable or necessary in response to changes in the direction of application of forces by the tensioned belt 17. The just described twisting movements of the frame member 13 are desirable in the event of an accident because they allow for a highly satisfactory dissipation of energy so that, irrespective of her or his weight, a person strapped in the seat is subjected to the action of identical or nearly identical accelerating or decelerating forces in the event of an accident or in response to aforementioned abrupt deceleration or stoppage of the vehicle in order to avoid or to reduce the impact in the event of an accident.

Another advantage of frame members which have an open profile (such as a Z-shaped, a C-shaped or an U-shaped cross-sectional outline) is that they do not act as resonant bodies (in contrast to frame members having a closed rectangular, square or like profile) and hence produce less noise in a motor vehicle. Still further, a frame member with an open profile is much more likely to eliminate or reduce vibratory movements.

The embodiment of FIG. 3 is desirable and advantageous because it allows for a simplification of the back support 11 and renders it possible to use one and the same back support 11 in the frame of the driver's seat or any other seat in a motor vehicle.

The force which is transmitted by the applied and tensioned belt 17 in the event of an accident or in response to abrupt stoppage or deceleration of the vehicle (due to inept handling or in order to avoid an accident) must be transmitted to the floor of the vehicle frame. This presents no problems at all if the base 10 of the frame of a seat is mounted directly on the floor of the driver's cabin or passenger compartment so that the frame members 19 of the base 10 can constitute integral portions of or can be fixedly connected to the floor. In such instances, the second coupling element (buckle) for the belt can be affixed directly to the floor.

Figure 5:
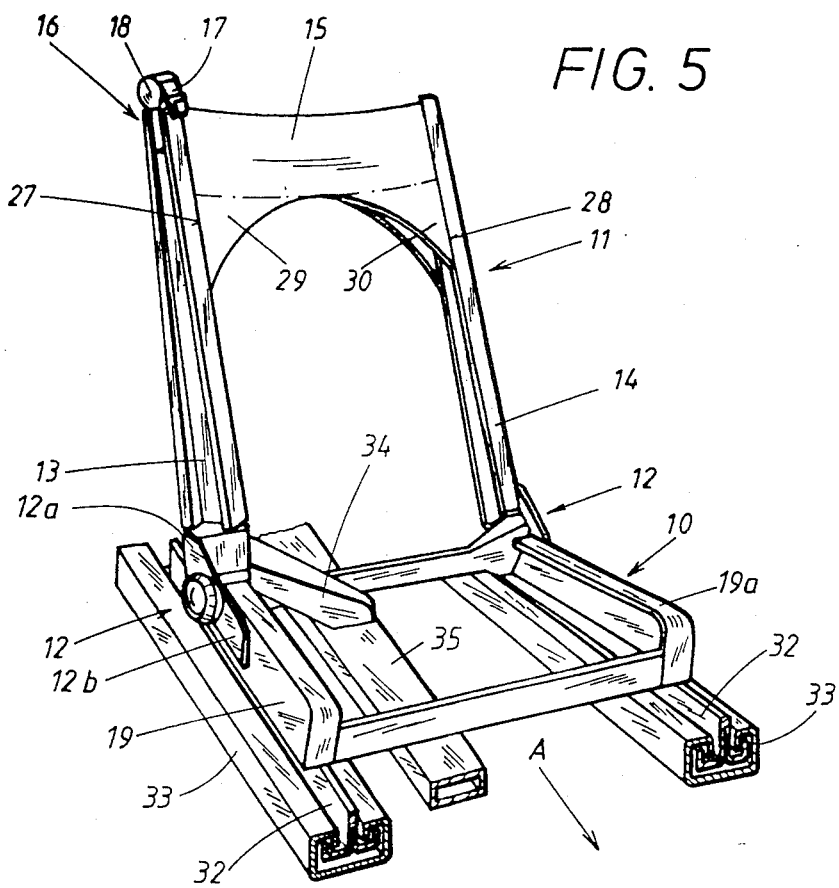
FIG. 5 is a perspective view of a frame which is similar to that of FIGS. 1 and 2 but is mounted for movement along the floor in the driver's cabin or passenger compartment of a motor vehicle.

However, the situation is quite different if the base 10 is adjustable with reference to the floor in and counter to the direction which is indicated by the arrow A and/or up and down. FIG. 5 shows a skeleton seat frame which is or can be identical with the frame of FIGS. 1-2 and wherein the base 10 is reciprocable along guide means in the form of inverted U-shaped rails 33 which are affixed to the floor of the vehicle. The lateral frame members 19 of the base 10 are rigid with inverted T-shaped rails 32 which are slidable on rolling elements (not shown) in the respective rails 33 in and counter to the directions indicated by arrow A. In order to avoid the need for extremely long and sturdy rails 32 and/or 33, the seating facility of FIG. 5 further comprises an abutment in the form of an additional or auxiliary rail 35 which is installed between and in parallelism with the floor-mounted rails 33 and is secured to the floor in any suitable way not forming part of the invention. The lower end portion of the lateral frame member 13 which carries the coupling element 17 has an inwardly projecting extension or arm 34 which overlies the additional rail 35 and can bear against the upper side of the rail 35 in the event of an accident or other emergency which entails at least some bending of the frame member 13 under the action of forces applied by the tensioned belt 17. The rail 35 may but need not be fixed to the floor in a position nearer to the one than the other rail 33.

The arm 34 could be caused to bear directly against the floor, i.e., the additional rail or abutment 35 is optional. Moreover, the rail 35 can be replaced with another abutment in the form of a simple plate or panel between the rails 33. Under normal circumstances, the extension or arm 34 and the rail 35 define a narrow gap which disappears in the event of an accident so that the arm 34 then bears against the adjacent portion of the rail 35 and forms with the frame member 13 a bell crank lever which is capable of standing pronounced deforming stresses. Moreover, the forces which develop at such time and are applied to the frame member 13 are transmitted to the floor, either directly or by way of the rail 35. A deformation of the floor of the motor vehicle is highly unlikely, especially since the arm 34 and the rail 35 are close to the B column, i.e., the B column contributes to a reinforcement of the respective portion of the floor.

The construction of the hinge joints 12 can be identical with or similar to that of the hinge joint which is disclosed in commonly owned U.S. Letters Pat. No. 4,275,924, granted June 30, 1981. The disclosure of this patent is incorporated herein by reference. Each hinge joint 12 can comprise a first component 12a in the form of a leaf or arm which is rigid with the portion 19 of the base 10, and a second component 12b in the form of a leaf or arm which is rigid with the adjacent lower portion of the frame member 13. The extension 34 is or can be rigid or integral with one of the components 12a, 12b and extends toward the portion 19b of the base 10.

Figure 6:
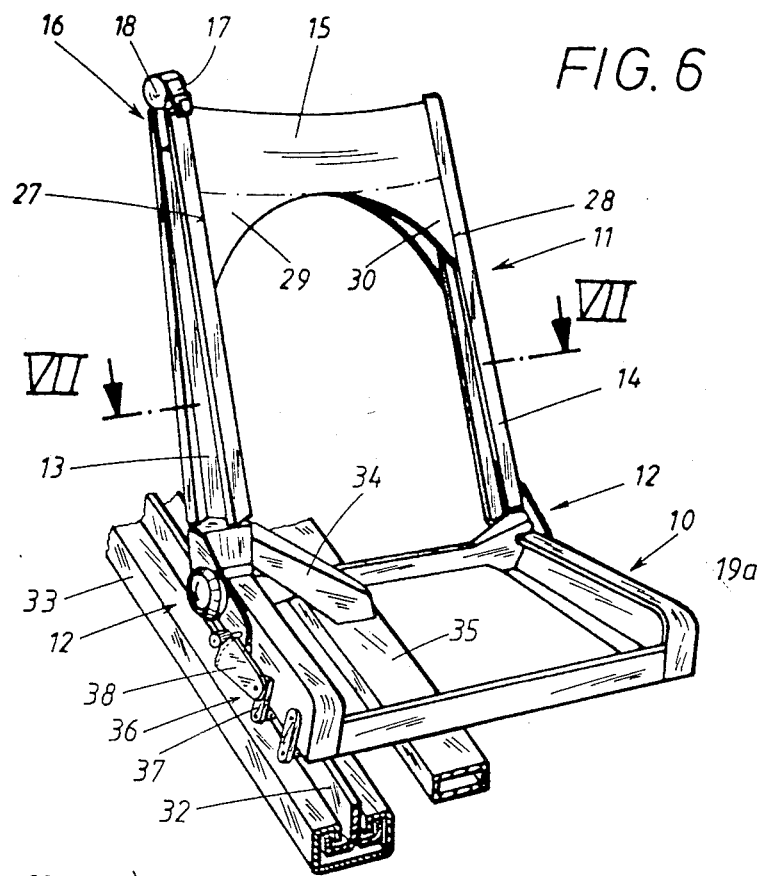
FIG. 6 is a similar perspective view but showing a frame whose base is adjustable up and down with reference to rails on the floor of a motor vehicle.
Figure 7:
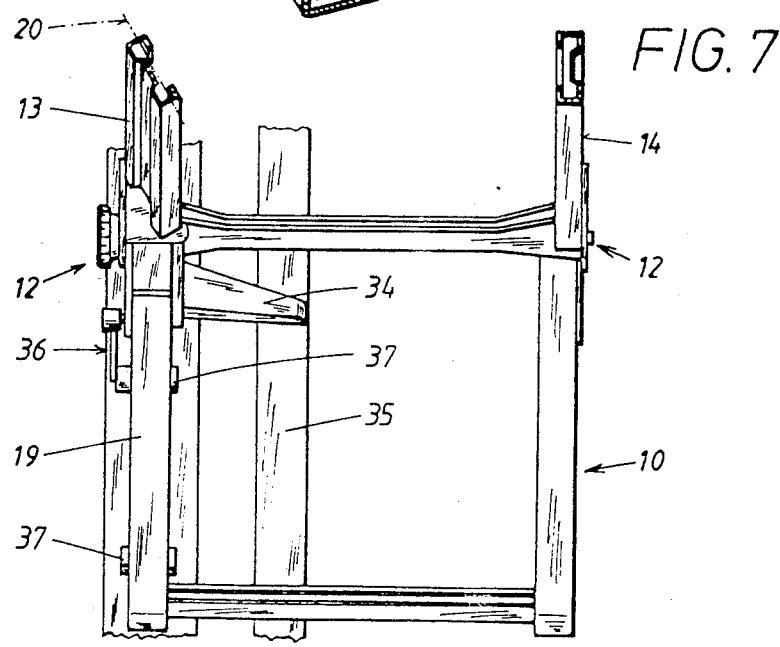
FIG. 7 is a plan view of the structure of FIG. 6, with the back rest frame shown in a horizontal sectional view as seen in the direction of arrows from the line VII—VII of FIG. 6.

FIGS. 6 and 7 show certain portions of a further seat wherein the lateral frame member 19 of the base 10 is movable up and down (toward and away from the adjacent floor-mounted rail 33) by an adjusting mechanism 36 of known design. This mechanism includes links 37 which are articulately connected to the rail 32 and to the frame member 19, and a gear segment 38 which mates with a pinion and serves as a means for changing the inclination of the links 37 and hence the distance between the base 10 and the rail 33. The segment 38 is connected for joint movement with the segment of the adjusting mechanism (not shown) for the right-hand lateral frame member 19a of the base 10 which is shown in FIGS. 6 and 7.

The arm 34 at the lower end of the lateral frame member 13 (which carries the coupling element 16 for the belt 17) is fixedly connected with the rail 32 for the lateral frame member 19. An additional rail 35 is provided to be engaged by the free end of the arm 34 in the event of an accident and/or under other circumstances when the belt 17 pulls the frame member 17 forwardly so as to eliminate the gap which is normally provided between the arm 34 and the rail 35. It will be readily appreciated that the hinge joints 12 which are used in the improved seat frame should be sufficiently strong to prevent a pivoting of the back rest 11 with reference to the base 10 in the event of an emergency. This also applies for the stability of the adjusting mechanism 36.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A seat for use with a safety belt, particularly in motor vehicles, comprising a frame including a base and a back rest, said back rest including two spaced-apart lateral frame members having first portions adjacent and second portions remote from the base, and said back rest further including a connector between said lateral frame members; and means for coupling the belt to said frame, including a first coupling element provided on one of said frame members and spaced apart from said base and a second coupling element in the region of said base and remote from the first portion of said one frame member so that, when the belt is in use and extends between said coupling elements, it applies to said one frame member a deforming force acting in the direction in which the belt extends between said coupling elements without the application of such deforming force to the other of said frame members, said one frame member having a non-circular cross-sectional outline with an axis of maximum resistance to said deforming force, said one frame member being disposed in a plane which is inclined with reference to a plane halving said seat and extending between said frame members, the belt between said coupling elements being disposed in or close to the plane of said one frame member.

2. The seat of claim 1, wherein the other of said frame members is substantially mirror symmetrical to said one frame member with reference to a plane which is located midway between said frame members.

3. The seat of claim 1, wherein said one frame member has an open profile with a web and two legs flanking said web, said web being disposed in or close to a plane which is parallel to said direction in which the belt extends between said coupling elements.

4. The seat of claim 1, wherein said one frame member has a substantially L-shaped cross-sectional outline, said axis of maximum resistance to deformation by said deforming force being disposed in the plane of said one frame member.

5. The seat of claim 1, wherein said connector is adjacent the second portions of said frame members and includes a narrower median portion and two wider end portions connected with the second portions of said frame members.

6. The seat of claim 5, wherein the end portions of said connector are integral with the second portions of the respective frame members.

7. The seat of claim 5, wherein said connector has at least one at least partially arcuate edge face facing toward said base.

8. The seat of claim 5, wherein said connector has at least one at least partially straight edge face facing toward said base.

9. The seat of claim 1, wherein said base includes a first portion adjacent said one frame member and a second portion adjacent the other of said frame members, and further comprising an extension disposed in the region of the first portion of said one frame member and projecting toward the second portion of said base, and an abutment for said extension, said extension engaging said abutment at least when said one frame member is acted upon by said deforming force in the event of an accident or under similar circumstances.

10. The seat of claim 9, wherein said abutment is provided on the floor of a motor vehicle between the first and second portions of said base.

11. The seat of claim 9, further comprising a hinge joint between the first portion of said one frame member and the first portion of said base, said joint including a first component rigid with said one frame member and a second component rigid with said first portion of said base, said extension being rigid with one of said components.

12. The seat of claim 9, wherein said abutment includes an elongated rail between the first and second portions of said base.

13. The seat of claim 9, further comprising stationary guide means for the first and second portions of said base, said base being movable relative to said guide means forwardly and backwards and said abutment being disposed between said guide means.

14. The seat of claim 13, further comprising adjusting means for changing the level of said base with reference to said guide means.

15. The seat of claim 9, wherein said extension is spaced apart from said abutment when said one frame member is not acted upon by said deforming force.

* * * * *